Patented Oct. 24, 1950

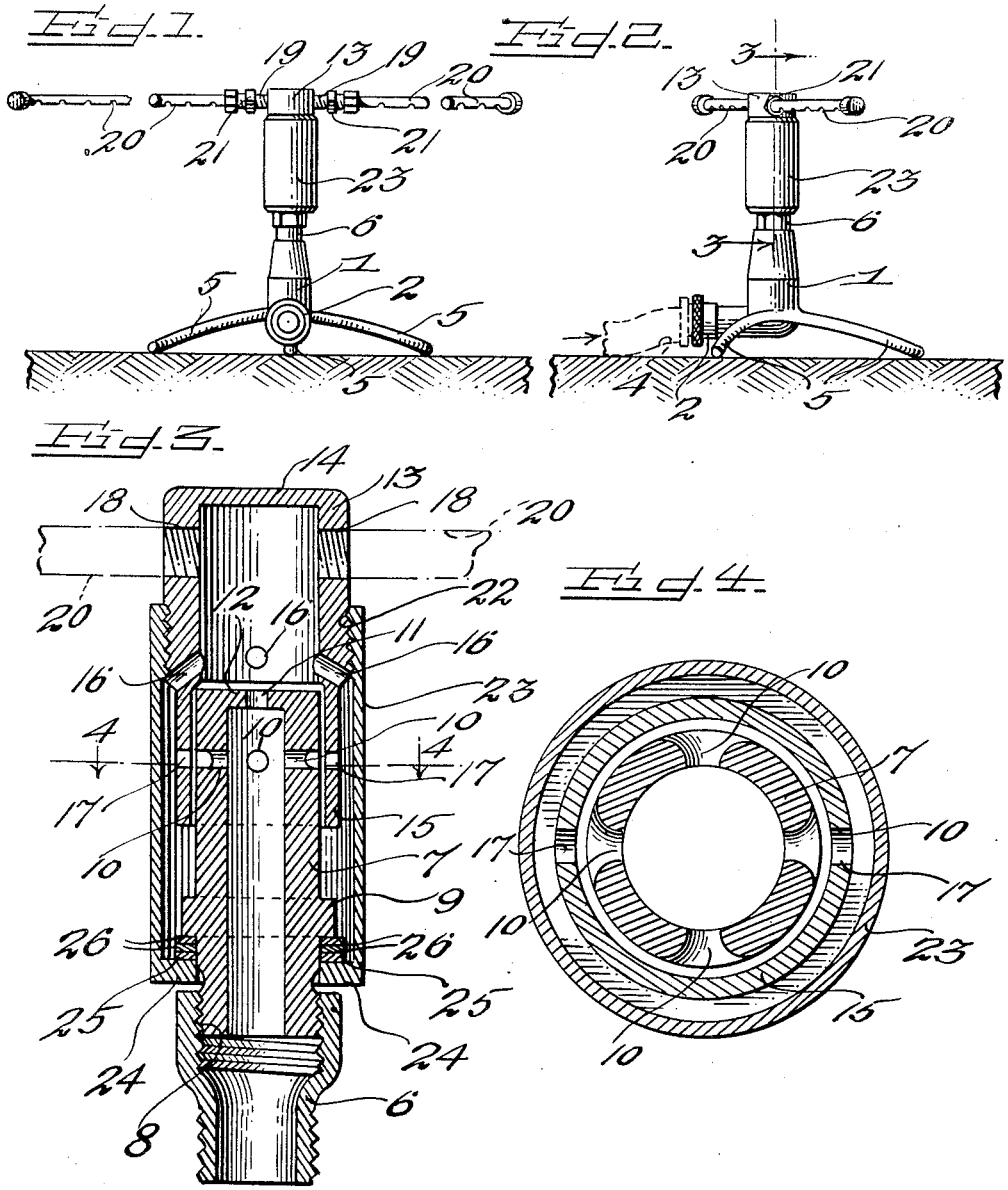

2,526,958

UNITED STATES PATENT OFFICE 2,526,958

LAWN AND GARDEN SPRINKLER

Clark H. Landis, Bowling Green, Ohio

Application May 4, 1946, Serial No. 667,317

5 Claims. (Cl. 299—18)

1

This invention relates to improvements in lawn and garden sprinklers.

An object of the invention is to provide an improved lawn and garden sprinkler which will be provided with a fixed body supported in spaced relation to the ground by a plurality of radially extending legs, and a rotatable head member on said body having perforated sprinkler arms supported thereby.

Another object of the invention is to provide an improved lawn and garden sprinkler which will be provided with a fixed body supported in spaced relation to the ground by a plurality of radially extending legs, and a skirted rotatable head member on said body acting as a valve to increase or decrease the water surge as it rotates around a stationary hub supported by said fixed body, said head member supporting a plurality of perforated sprinkler arms.

A further object of the invention is to provide an improved lawn and garden surge sprinkler which will be highly efficient in operation, and relatively inexpensive to manufacture and produce.

Other objects will appear as the description proceeds.

In the accompanying drawings which form a part of this application,

Figure 1 is a front elevation of the improved lawn and garden surge sprinkler;

Figure 2 is a side elevation of the improved lawn and garden surge sprinkler showing a hose connection in dotted lines connected therewith;

Figure 3 is a vertical sectional view taken on the line 3—3 of Figure 2, and

Figure 4 is a transverse sectional view taken on the line 4—4 of Figure 3.

Like characters of reference are used throughout the following specification and the accompanying drawings to designate corresponding parts.

In carrying out the invention, there is provided an improved lawn and garden sprinkler having a hollow base portion which is adapted to be connected with a water hose 4 in the usual manner. A plurality of radially and downwardly extending legs 5 are formed on the base portion 1 and serve to hold it in spaced relation to the ground. The upper end of the base portion 1 is internally threaded and is adapted to receive the bushing 6, which is externally threaded at its lower end, and internally threaded at its upper end.

A centrally disposed hollow hub portion 7 is externally threaded on its lower end as at 8, and

2 is adapted to screw into the upper end of the bushing 6 to be supported thereby. The hub 7 is provided with an annular flange 9 about its lower end, the purpose of which will be hereinafter described. The hub 7 is further provided with four equally spaced water outlet or discharge openings 10 being smaller at their inner ends and flared outwardly towards their outer ends at the outer surface of the said hub. A small port or water opening 11 will be formed through the closed upper end 12 of the hub 7, the purpose of which is to start the operation of the sprinkler if the ports or openings 10 are not in correct position when the water is turned on at the water supply outlet.

A sprinkler head member 13 is cylindrical in shape and is closed as at 14 at its upper end, and is formed with a reduced skirt portion 15 on its lower end which is adapted to fit loosely about the upper end of the hub 7. A plurality of downwardly and outwardly extending water inlet ports 16 are formed through the lower portion of the thickened wall of the sprinkler head 13, and a pair of oppositely disposed laterally extending water outlet ports 17 are formed through the reduced skirt portion 15 of the sprinkler head in line with the four water outlet or discharge openings or ports 10 extending through the fixed hub 7.

A pair of oppositely disposed apertures 18 are formed through the upper portion of the side wall of said sprinkler head 13 and are internally threaded to receive the threaded unions 19, which in turn support the outwardly extending apertured or perforated water distributing arms 20 by means of the threaded nuts 21.

The lower portion of the thickened head wall is threaded as at 22 and receives the internally threaded upper end of the outer shell 23 which extends downwardly in spaced relation to the reduced skirt 15 and hub 7, terminating with the inturned annular flange 24, upon which the compression washer 25 and the bronze washers 26 are seated, said upper bronze washer being engaged by the annular flange 9 on the lower end of the hub 7, whereby the washers will be held in contact by the water pressure, which forces the shell 23 upward and holds constant pressure on the washers.

When the water is turned on, it will enter the hollow hub 7 and pass through the ports 10 and the ports or apertures 17 into the space between the shell 23 and the hub 7, and from thence the water will pass upwardly through the slanting ports 16 to the sprinkler head 13 to be discharged through the oppositely disposed apertured water distributing arms 20.

As the skirt of the sprinkler head 13, which contains the opposed port 17, rotates around the hub 7, which contains the four ports 10, the water surge is increased as the ports 17 approach the ports 10, and decreases as the ports 17 recede from the openings or ports 10. The openings 10 are flared outwardly to drag out the throttled partial increase of flow from the arms 20.

As before mentioned, should the ports 17 and 10 be not in registry when the water is turned on, the water will pass upwardly through the central port 11 and through the top of the hub 7 to the water distributing arms 20 to start their rotation, after which the rotation of the sprinkler will operate as hereinbefore described.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having thus described my invention what I claim as new and desire to secure by Letters Patent of the United States is:

1. A surge lawn and garden sprinkler including a hollow body adapted to be supported in spaced relation from the ground, a hollow hub fixed therein having a plurality of outwardly tapered ports formed through its wall, a sprinkler head having a reduced skirt rotatably mounted on said hub and having a pair of diametrically opposed ports therethrough for registry with said tapered ports upon rotation of said head relative to said hub, a shell supported on said sprinkler head and having a water tight bearing on said hub at its lower end, and perforated water distributing arms supported on said sprinkler head.

2. A surge lawn and garden sprinkler including a hollow body adapted to be supported in spaced relation from the ground, a hollow hub fixed therein having a plurality of outwardly tapered ports through its side wall and a port formed through its upper end, a sprinkler head having a reduced skirt rotatably mounted on said hub and having a pair of diametrically opposed disposed ports therethrough for registering with said tapered ports upon rotation of said head relative to said hub, said head also being provided with a plurality of downwardly and outwardly slanting ports positioned above said hub, a shell supported on said sprinkler head and having a water tight bearing on said hub at its lower end, and perforated water distributing arms supported on said sprinkler head.

3. A surge lawn and garden sprinkler including a hollow body adapted to be supported in spaced relation from the ground, a hollow hub fixed therein having a plurality of outwardly tapered ports formed through its side wall and a vertical port extending through its upper end, a sprinkler head including a reduced skirt rotatably mounted on said hub and having oppositely disposed ports therethrough for registering with said tapered ports upon rotation of said head relative to said hub, said head also having a plurality of downwardly and outwardly extending ports disposed above said first mentioned ports and above the top of said hub, a shell adjustably supported on said sprinkler head having a water tight bearing on said hub at its lower end and detachable perforated water distributing arms supported on said sprinkler head.

4. A lawn and garden sprinkler comprising a hollow member, said member having a pair of diametrically opposed outwardly flared openings therein, a flange on said member disposed below said openings, a shell embracing said member and having a lower flanged portion underlying the flange on said member, compressible sealing means about said member and interposed between the flange on said member and the flanged portion of said shell, said shell having an internally threaded upper end, a head threaded to the upper end of said shell and having a depending skirt portion surrounding said member and spaced laterally from the inner periphery of said shell, said skirt portion having a pair of diametrically opposed ports therein for registering with the openings in said member during rotation of said skirt portion, said head and said shell with respect to said member, said head having inlet ports therein adjacent said skirt portion to form a communication between the interior of said head and the space between said skirt portion and said shell, a pair of diametrically opposed hollow arms carried by and projecting laterally from said head and having lower peripheries, the lower peripheries of said arms having spaced openings therein to impart rotation to said arms upon the ejection of fluid, under pressure, through the openings in said arms.

5. The combination of claim 4 wherein said member includes an upper centrally apertured wall for the passage of fluid under pressure through the member, into the head and hence into the arms to impart rotation to the arms, the head including the skirt portion and the shell when the ports in said skirt portion are disposed between the openings in said member.

CLARK H. LANDIS.

REFERENCES CITED

The following references are of record in the file of this patent:

UNITED STATES PATENTS

| Number | Name | Date |
|---|---|---|
| 1,618,537 | Kittinger | Feb. 22, 1927 |
| 1,618,538 | Kittinger | Feb. 22, 1927 |
| 1,766,514 | Henry | June 24, 1930 |
| 1,953,837 | Thorold et al. | Apr. 3, 1934 |
| 1,976,030 | Lighthall | Oct. 9, 1934 |